(12) United States Patent
Li (10) Patent No.: US 11,284,268 B2
(45) Date of Patent: Mar. 22, 2022

(54) WIRELESS COMMUNICATION METHOD AND APPARATUS

(71) Applicant: XI'AN ZHONGXING NEW SOFTWARE CO., LTD., Shaanxi (CN)

(72) Inventor: Bin Li, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/627,731

(22) PCT Filed: Oct. 22, 2018

(86) PCT No.: PCT/CN2018/111289
§ 371 (c)(1),
(2) Date: Dec. 30, 2019

(87) PCT Pub. No.: WO2019/095938
PCT Pub. Date: May 23, 2019

(65) Prior Publication Data
US 2021/0153028 A1 May 20, 2021

(30) Foreign Application Priority Data
Nov. 14, 2017 (CN) .......................... 201711122857.0

(51) Int. Cl.
*H04W 16/14* (2009.01)
*H04W 4/02* (2018.01)
(Continued)

(52) U.S. Cl.
CPC ........... *H04W 16/14* (2013.01); *H04L 5/0053* (2013.01); *H04W 4/02* (2013.01); *H04W 72/042* (2013.01);
(Continued)

(58) Field of Classification Search
CPC ..... H04W 16/14; H04W 72/082; H04W 4/02; H04L 5/0071
See application file for complete search history.

(56) References Cited

U.S. PATENT DOCUMENTS

2006/0142047 A1* 6/2006 Russo .................... A63F 13/23
455/550.1
2007/0087756 A1* 4/2007 Hoffberg ................ G06Q 20/40
455/450

(Continued)

FOREIGN PATENT DOCUMENTS

CN 103051411 A 4/2013
CN 105376864 A 3/2016
(Continued)

OTHER PUBLICATIONS

International Search Report for corresponding application PCT/CN2018/111289 filed Oct. 22, 2018; dated Jan. 22, 2019.
(Continued)

*Primary Examiner* — Faruk Hamza
*Assistant Examiner* — Abusayeed M Haque
(74) *Attorney, Agent, or Firm* — Cantor Colburn LLP (57) ABSTRACT

Provided are a wireless communication method and apparatus. The method includes: determining an overlapping wireless frequency band resource between a cellular communication system and a wireless-fidelity (WIFI) system; transmitting, by the cellular communication system, an interference signal on the overlapping wireless frequency band resource to shield a terminal of the WIFI system from performing communications on the overlapping wireless frequency band resource; and communicating, by the cellular communication system, with a terminal on the overlapping wireless frequency band resource.

18 Claims, 5 Drawing Sheets

(51) Int. Cl.
  *H04W 72/04* (2009.01)
  *H04W 72/08* (2009.01)
  *H04L 5/00* (2006.01)
(52) U.S. Cl.
  CPC ..... *H04W 72/0453* (2013.01); *H04W 72/082* (2013.01)

(56) References Cited

U.S. PATENT DOCUMENTS

| | | | | |
|---|---|---|---|---|
| 2008/0298450 | A1* | 12/2008 | Zhang | H04W 72/0453 375/227 |
| 2010/0317420 | A1* | 12/2010 | Hoffberg | G06Q 30/0282 463/1 |
| 2014/0213219 | A1* | 7/2014 | Mohebbi | H04W 76/12 455/411 |
| 2014/0269562 | A1* | 9/2014 | Burchill | H04W 76/15 370/329 |
| 2014/0369394 | A1* | 12/2014 | Ruuska | H04W 16/28 375/224 |
| 2015/0043363 | A1* | 2/2015 | Koskinen | H04W 16/14 370/252 |
| 2016/0270047 | A1* | 9/2016 | Kazmi | H04L 5/0005 |
| 2016/0277161 | A1* | 9/2016 | Haque | H04L 27/2634 |
| 2017/0181146 | A1* | 6/2017 | Franceschini | H04W 72/044 |
| 2020/0336987 | A1* | 10/2020 | Mukherjee | H04W 52/146 |

FOREIGN PATENT DOCUMENTS

| | | |
|---|---|---|
| CN | 106412476 A | 2/2017 |
| CN | 107182060 A | 9/2017 |
| CN | 107342838 A | 11/2017 |
| EP | 3035764 A1 | 6/2016 |
| WO | 2012044329 A1 | 4/2012 |

OTHER PUBLICATIONS

European Search Report for corresponding application EP 18 878 322.9; Report dated Jun. 24, 2021.
Chinese Office Action for corresponding application 201711128857.0; Report dated Jan. 28, 2022.

* cited by examiner

WIRELESS COMMUNICATION METHOD AND APPARATUS

CROSS-REFERENCES TO RELATED APPLICATIONS

This is a U.S. National Stage Application, filed under 35 U.S.C. 371, of International Patent Application No. PCT/CN2018/111289, filed on Oct. 22, 2018, which claims priority to Chinese patent application No. 201711122857.0 filed on Nov. 14, 2017, contents of both of which are incorporated herein by reference in their entireties.

TECHNICAL FIELD

The present disclosure relates to, but is not limited to, the field of communications and, in particular, relates to a wireless communication method and apparatus.

BACKGROUND

With the rapid development of wireless communication technologies, spectrum resources become more precious, national governments manage more strictly the authorization and use of the spectrum resources, and the authorization costs of the spectrum resources are increasingly expensive. In many regions around the world, since wireless spectrum resources are relatively scarce and expensive, many small and medium operators cannot obtain sufficient high-quality and continuous spectrum resources. There are a construction difficulty and a limited network capacity for a wireless communication system, especially some private networks, for example, a wireless communication system for ocean, high-speed railway, and a ground-to-air wireless communication network.

SUMMARY

In one aspect of embodiments of the present disclosure, a wireless communication method is provided. The method includes steps described below. An overlapping wireless frequency band resource between a cellular communication system and a wireless-fidelity (WIFI) system is determined. The cellular communication system transmits an interference signal on the overlapping wireless frequency band resource to prevent a terminal in the WIFI system from performing communications on the overlapping wireless frequency band resource. The cellular communication system communicates with a terminal on the overlapping wireless frequency band resource.

In another aspect of the embodiments of the present disclosure, a wireless communication apparatus is provided, which is disposed in a cellular communication system. The wireless communication apparatus includes a determining module, a transmitting module and a communication module. The determining module is configured to determine an overlapping wireless frequency band resource between the cellular communication system and a wireless-fidelity (WIFI) system. The transmitting module is configured to transmit an interference signal on the overlapping wireless frequency band resource to enable a terminal in the WIFI system to adaptively perform WIFI communications on other wireless frequency band resources of the WIFI system. The communication module is configured to communicate with a terminal on the overlapping wireless frequency band resource.

In another aspect of the embodiments of the present disclosure, a communication device is further provided. The communication device includes a memory and a processor. The processor is configured to execute a program stored on the memory. The program, when executed, performs steps of the method according to the embodiments described above.

In another aspect of the embodiments of the present disclosure, a storage medium is further provided. The storage medium includes a stored program. The program, when executed, performs steps of the method according to the embodiments described above.

In the embodiments described above of the present disclosure, a set interference signal is transmitted at a fixed frequency domain position, so that the WIFI system stops working on this frequency band and automatically switches to other frequency bands. In this way, this frequency band is available to the cellular communication system, and thus the WIFI system and the cellular communication system coexist and do not interfere with each other on frequency resources.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

A wireless-fidelity (WIFI) system based on the IEEE802.11 series of protocols generally occupies 2.4G and 5G spectrum resources. The 2.4G frequency band (IEEE802.11b/g/n) includes spectrum resources of 2.4 GHz to 2.4835 GHz, occupies an 83.5 MHz bandwidth, and is divided into 14 sub-channels. Each sub-channel has a width of 22 MHz, central frequency points of adjacent channels are spaced by 5 MHz, and adjacent multiple sub-channels overlaps in frequency. The 5G frequency band (IEEE802.11n) includes spectrum resources of 5.150 GHz to 5.850 GHz and occupies 70 MHz bandwidth in total. The IEEE802.11n is currently the mainstream standard of WIFI devices, that is, the existing WIFI devices need to simultaneously support both the 2.4G and 5G frequency bands. Both the two frequency bands include multiple sub-channels, and generally communication requirements of the WIFI system can be satisfied by merely selecting one or part of the sub-channels.

Spectrum resources occupied by the WIFI system basically belong to an Industrial Scientific Medical (ISM) frequency band. An ISM spectrum is defined by the ITU Radio Communication Sector (ITU-R), which specifically means that all countries around the world have reserved some wireless frequency bands for applications in industry, scientific researches and microwave medical treatments. These frequency bands can be used without license, as long as certain transmit power (generally less than 1 W) needs to be obeyed and the use of these frequency bands does not interfere with other frequency bands. A specific setting for the ISM frequency band may be configured according to practical situations of all the countries. However, the 2.4 GHz frequency band is regarded as a common ISM frequency band of all the countries in the world.

Figure 1:
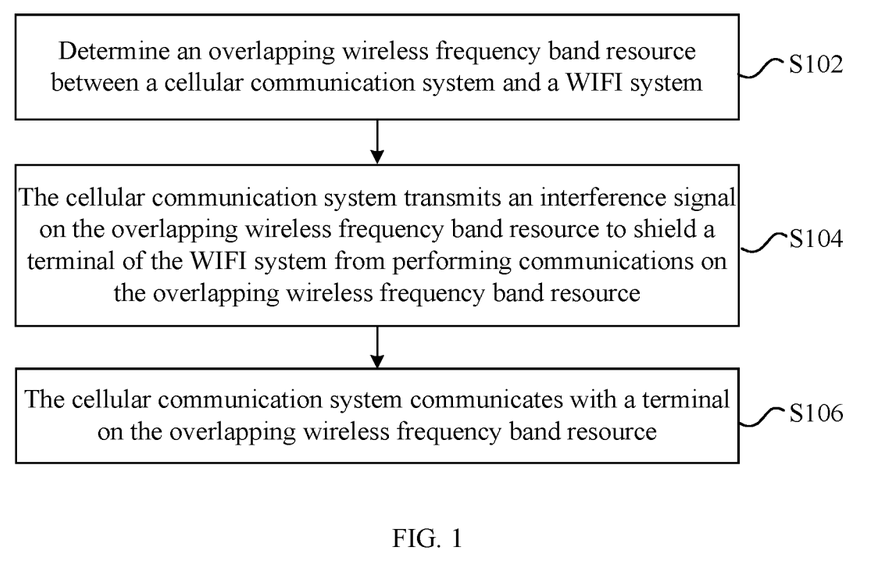
FIG. 1 is a flowchart of a wireless communication method according to an embodiment of the present disclosure.

Based on the above, it is completely feasible to establish another cellular communication system using the same spectrum as the WIFI system on the ISM spectrum, but a design method is needed to avoid mutual interference between different systems. The embodiments of the present disclosure provide a wireless communication method and apparatus capable of suppressing WIFI interference in a cellular communication system using the same frequency resources as the WIFI system, so that the WIFI system and the cellular communication system may work normally at the same time, and do not interfere with each other. FIG. 1 is a flowchart of a wireless communication method according to an embodiment of the present disclosure. As shown in FIG. 1, the method includes steps described below.

In step S102, an overlapping wireless frequency band resource between the cellular communication system and the WIFI system is determined.

In step S104, the cellular communication system transmits an interference signal on the overlapping wireless frequency band resource to enable a terminal in the WIFI system to adaptively switch to other wireless frequency band resources of the WIFI system for performing WIFI communications.

In step S106, the cellular communication system communicates with a terminal on the overlapping wireless frequency band resource.

Through the above steps, a set interference signal is transmitted at a fixed frequency domain position, so that the WIFI system stops working at this frequency band and automatically switches to other frequency bands for communications. In this way, the overlapping wireless frequency band resource is available to another wireless communication system, and thus the two systems coexist and do not interfere with each other on frequency resources.

In some embodiments, step S102 may include: determining according to a size and a position of an occupied frequency-domain bandwidth of the cellular communication system, an overlapping sub-channel set between the cellular communication system and the WIFI system.

In some embodiments, before the cellular communication system transmits the interference signal on the overlapping wireless frequency band resource, the method further includes: determining, on a sub-channel set of the cellular communication system, a position for transmitting the interference signal and a number of the interference signal. The position for transmitting the interference signal and the number of the interference signal satisfy a condition that the interference signal interferes with each sub-channel in the sub-channel set of the WIFI system.

For example, the position for transmitting the interference signal is located on a guard band of the cellular communication system or on a transmission bandwidth of the cellular communication system.

For another example, transmit power of the interference signal satisfies a condition that an average received power value of each sub-channel in the sub-channel set received by all WIFI terminals in an interference area is not less than a preset threshold.

For another example, a frequency domain bandwidth of the interference signal is determined according to the number of the interference signal and the transmit power of the interference signal.

In some embodiments, the transmit power of the interference signal, a bandwidth of the interference signal and the number of the interference signal satisfy the following formula:

$$\sum_{i=1}^{N} P_i * W_i - PL_{MAX} - 10 * \log_{10}(B) \geq X;$$

N denotes the number of the interference signals, $P_i$ denotes transmit power on a unit frequency domain bandwidth of an i-th interference signal, $W_i$ denotes a frequency domain bandwidth of the i-th interference signal, $PL_{MAX}$ denotes a maximum path loss of an interfered sub-channel within a coverage range of the WIFI system, B denotes a frequency domain bandwidth of a sub-channel of the WIFI system, and X denotes a preset threshold for average received power of the interfered sub-channel.

When the cellular communication system is a frequency division duplex (FDD) system, the interference signal is transmitted in an entire time domain of the FDD system. When the cellular communication system is a time division duplex (TDD) system, the interference signal is only transmitted within respective receiving slots of a transmitting end and a receiving end of the TDD system.

When the position for transmitting the interference signal is located on the transmission bandwidth of the cellular communication system, a frequency domain position corresponding to the position for transmitting the interference signal within a bandwidth of the cellular communication system is configured as a non-use region. In step S102 in the preceding embodiment, an overlapping sub-channel set A between the WIFI system and a wireless system which coexists with the WIFI system may be determined according to a size and a position of an occupied frequency-domain bandwidth of the wireless system. The size of the occupied frequency-domain bandwidth may include a size of an occupied frequency band, for example, a number of occupied carriers, a number of occupied frequency bands, etc. The position of the occupied frequency-domain bandwidth may correspond to frequencies of the occupied frequency bands.

In step S104 in the preceding embodiments, a preset interference signal transmitted at a reasonable position according to the determined sub-channel set A may satisfy principles described below.

(1) A size of the transmit power P on the unit frequency domain bandwidth of the interference signal needs to satisfy that the average received power value of each sub-channel in the set A is not less than a threshold X (a value of the threshold X is related to a definition in IEEE802.11n and X needs to be greater than or equal to −62 dBm) for all the WIFI terminals within an area desired to be interfered which receive the sub-channel. The area desired to be interfered may be determined according to an area desired to be covered by the wireless communication system.

(2) The position for transmitting the interference signal and the number N of the interference signal need to ensure that the interference signal interferes with each sub-channel in the set A.

In some embodiments, a best principle for selecting the transmitting position of the interference signal is to minimize influence on performance of the coexistent wireless communication system, for example, a position on the guard band of the wireless communication system may be selected.

In some embodiments, a principle for determining the number of the interference signal is the number of interference signals required for satisfying a requirement for interfering the WIFI system is as small as possible, and influence on the performance of the coexistent wireless communication system is minimum.

(3) The interference signal may be a fixed sequence or a randomly-generated sequence. Since a requirement for the interference signal is an average value of received power of a signal received by the terminal within a bandwidth of each sub-channel, specific requirements may not be placed on the transmitting content of the interference signal. However, a square wave, a narrowband pulse and the like may be suggested as a default interference signal in some embodiments.

(4) As for the frequency domain bandwidth W of the transmission of the interference signal, a main principle for selecting the frequency domain bandwidth is to minimize influence on the performance of the coexistent wireless communication system. In practice, the size of the frequency domain bandwidth is closely related to the transmit power of the interference signal and the number of interference signals. It is to be understood that the frequency domain bandwidth of the interference signal is inversely proportional to the transmit power of the interference signal. The greater the transmit power, the smaller the bandwidth that the interference signal needs to occupy. For the same interfering sub-channel set, the greater the number of interference signals to be transmitted, the smaller the power of the interference signal, and vice versa. In some embodiments, it is suggested that an optimal frequency bandwidth be determined according to the transmit power of the interference signal, the number of interference signals and the like.

In summary, for each specific sub-channel of the WIFI system, parameters such as the transmit power of the interference signal, the bandwidth of the interference signal and the number of interference signals within the bandwidth of the specific sub-channel need to satisfy the following formula:

$$\Sigma_{i=1}^{N} P_i * W_i - PL_{MAX} - 10*\log_{10}(B) \geq X(\text{dBm});$$

N denotes the number of interference signals, $P_i$ denotes the transmit power in dBm/Hz on the unit frequency domain bandwidth of the i-th interference signal, $W_i$ denotes the frequency domain bandwidth in Hz of the i-th interference signal, $PL_{MAX}$ denotes a maximum path loss in dB of the specific sub-channel within the coverage range of the WIFI system, B denotes the frequency domain bandwidth of the sub-channel of the WIFI system, which is generally 20 MHz, and X denotes the threshold in dBm for average received power.

For a time domain position for transmitting the interference signal, the interference signal may be continuously transmitted within a time domain operating range of the WIFI system. However, in some embodiments, the time domain position of the interference signal may be adaptively configured according to different duplex modes of a new radio (NR) system. For the FDD wireless communication system, the interference signal is transmitted in an entire time domain of the FDD system. For the TDD wireless communication system, the interference signal may be only transmitted within the respective receiving slots of the transmitting end and the receiving end of the TDD system.

In the embodiments described above, the influence on the coexistent wireless communication system may be determined according to the position of the interference signal determined in the preceding steps, and the frequency domain position corresponding to the frequency domain position of the interference signal within a system bandwidth is defined as the non-use region within the system. Neither the transmitting end nor the receiving end transmits and receives data in the non-use region.

In some embodiments, for the FDD/TDD wireless communication system, a frequency domain range described above is defined as the non-use region in whole system time domain.

Figure 3:
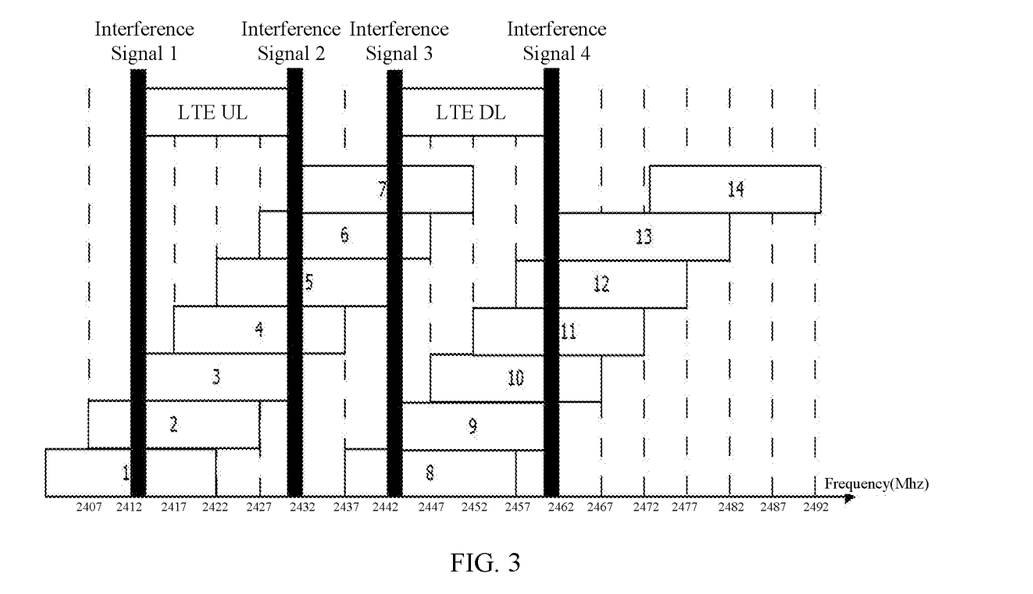
FIG. 3 is a schematic diagram illustrating frequency domain positions of a wireless system, and frequency domain positions and bandwidths of interference signals according to an embodiment of the present disclosure.

In this embodiment, the wireless communication system involved is a standard FDD LTE wireless communication system based on the 3GPP. As shown in FIG. 3, an uplink/downlink operating frequency band of the wireless communication system is 2.412-2.432 GHz/2.4442-2.452 GHz. A WIFI system needs to be interfered on the corresponding frequency band, and a maximum coverage path loss of the WIFI system is 80 dBm.

In this embodiment, transmission parameters of a specific interference signal are obtained through steps described below.

Figure 2:
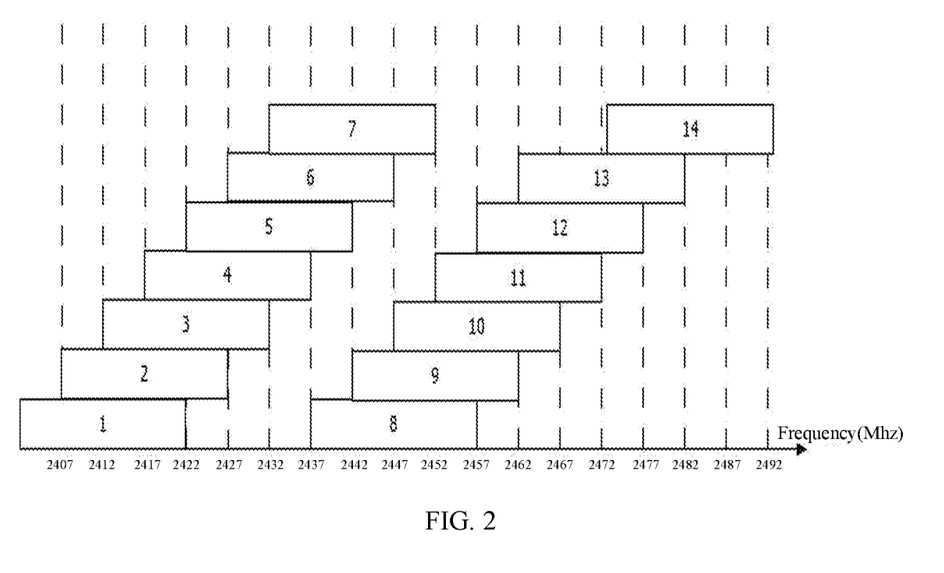
FIG. 2 is a schematic diagram illustrating frequency domain bandwidths occupied by sub-channels of a 2.4 G WIFI system according to an embodiment of the present disclosure.

In step 1, referring to FIG. 2, according to the operating frequency bands of the LTE wireless communication system, an overlapping sub-channel set between the LTE wireless communication system and the WIFI system whose frequency domain resources overlap with those of the LTE wireless communication system may be determined as {1, 2, 3, 4, 5, 6, 7, 8, 9, 10, 11, 12}, 12 sub-channels in total.

In step 2, referring to FIG. 3, an uplink/downlink bandwidth of the LTE wireless communication system specified in the standard protocol is 20 MHz, where a bandwidth practically used for data transmissions is 18 MHz, and guard bands of 1 MHz exist on both sides. To minimize influence on performance of the LTE wireless communication system, it is considered that a position of an interference signal is within the two guard bands. Then, the number of interference signals is 4, and a frequency bandwidth of each interference signal is 1 MHz (the respective frequency domain positions are 2.412-2.413 GHz, 2.431-2.432 GHz, 2.4442-2.443 GHz, and 2.461-2.462 GHz). A suppression threshold is determined as −62 dBm. Each of the four interference signals corresponds to 3 sub-channels of the WIFI system. The interference signals 1 to 4 need to interfere sub-channel sets {1, 2, 3}, {4, 5, 6}, {7, 8, 9} and {10, 11, 12}, respectively. For each interference signal, transmit power on a unit frequency domain bandwidth may be calculated according to the following formula:

$$\Sigma_{i=1}^{1} P_i * 1 * 10^6 - 80 - 10 * \log_{10}(20 * 10^6) \geq -62 \text{ (dBm)}.$$

The transmit power on the unit frequency domain bandwidth of the interference signal needs to be greater than or equal to 31 dBm/Hz according to the preceding formula.

In step 3, since the position of the interference signal is selected to be within the guard band of the LTE wireless communication system, a non-use region does not need to be reserved in the LTE wireless communication system, and the data transmissions of the LTE wireless communication system are not affected.

In this case, a terminal of the WIFI system may adaptively switch to a 2.4 G sub-channel 13/14 and all 5 G sub-channels for performing communications based on a 802.11n protocol.

Figure 4:
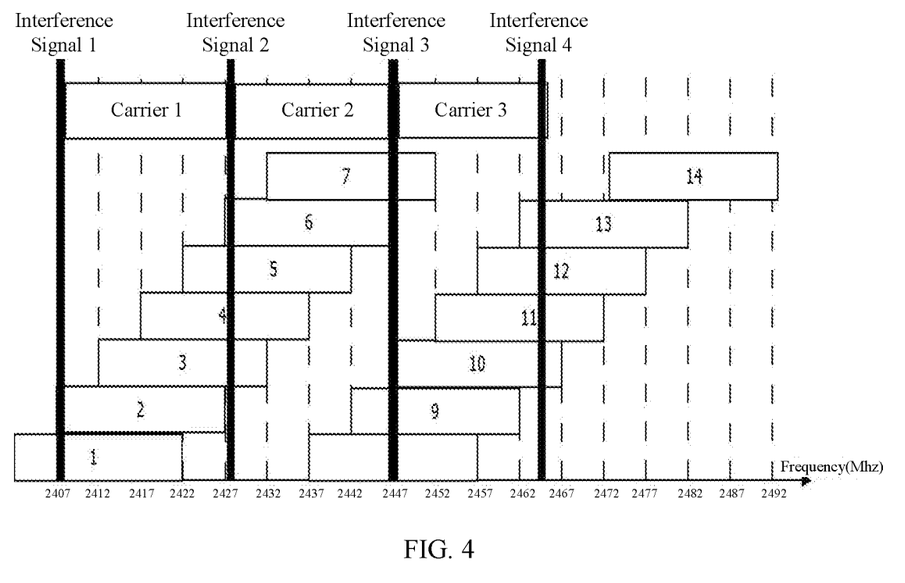
FIG. 4 is a schematic diagram illustrating frequency domain positions of a wireless system, and frequency domain positions and bandwidths of interference signals according to an embodiment of the present disclosure.

In this embodiment, a wireless communication system provided is a dedicated system for air coverage. As shown in FIG. 4, three carriers are included in frequency domain, each carrier has a bandwidth of 18 MHz. Operating frequency bands of the three carriers are 2409.1-2427.1 MHz, 2427.7-2445.7 MHz, and 2446.3-2464.3 MHz, respectively. A WIFI system needs to be interfered on a corresponding frequency band, and a maximum coverage path loss of the WIFI system is 80 dBm.

In this embodiment, transmission parameters of a specific interference signal are obtained through steps described below.

In step 1, referring to FIG. 2, according to the operating frequency bands of the dedicated system for air coverage, an overlapping sub-channel set between the dedicated system for air coverage and the WIFI system whose frequency domain resources overlap with those of the dedicated system for air coverage may be determined as {1, 2, 3, 4, 5, 6, 7, 8, 9, 10, 11, 12, 13}, 13 sub-channels in total.

In step 2, referring to FIG. 3, the dedicated system for air coverage includes three carriers in frequency domain, and each carrier has the bandwidth of 18 MHz. To minimize influence on performance of the dedicated system for air coverage, it is considered that positions of some interference signals may be located within guard bands between carriers. In order to interference and suppress all sub-channels of the WIFI system, the number of interference signals is 4, and respective frequency domain bandwidths of the four interference signals are 600 KHz, 600 KHz, 600 KHz and 540 KHz (the respective frequency domain positions are 2408.5-2409.1 MHz, 2407.1-2427.7 MHz, 2445.7-2446.3 MHz, and 2460.3-2460.84 MHz). A suppression threshold is determined as −62 dBm. Each of the four interference signals correspond to several sub-channels of the WIFI system. The interference signals 1 to 4 need to interfere sub-channel sets {1, 2}, {3, 4, 5, 6}, {7, 8, 9, 10} and {10, 11, 12, 13}, respectively. For each interference signal (both an interference signals 3 and an interference signal 4 may interfere a sub-channel 10, and N may be 2 in the following calculation formula; and N for other sub-channels is 1), transmit power on a unit frequency domain bandwidth may be calculated according to the following formula:

$$\sum_{i=1}^{N} P_i * W_i - 80 - 10 * \log_{10}(20 * 10^6) \geq -62 \text{ (dBm)}.$$

According to the preceding formula, transmit power on the unit frequency domain bandwidth of each of the first 3 interference signals needs to be greater than or equal to 33.2 dBm/Hz, and transmit power on the unit frequency domain bandwidth of a fourth interference signal needs to be greater than or equal to 33.6 dBm/Hz.

In step 3, the positions of the first 3 interference signals are selected to be within a non-transmission bandwidth of the dedicated system for air coverage, and the position of the fourth interference signal is selected to be within a transmission bandwidth of the dedicated system for air coverage. Therefore, the bandwidth of the fourth interference signal is considered to be reduced as much as possible to reduce the influence on the performance of the dedicated system for air coverage. Moreover, a 540 KHz range of a corresponding carrier 3 is a non-use region, and the dedicated system does not use the non-use region for data communications.

In this case, a terminal of the WIFI system may adaptively switch to a 2.4 G sub-channel 14 and all 5 GHz sub-channels for performing communications based on an 802.11n protocol.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation mode.

A wireless communication apparatus is further provided in this embodiment. The wireless communication apparatus may be used as a standalone apparatus for suppressing and interfering a WIFI system or may also be used as a stand-alone unit inside a wireless communication system or be combined with other modules in the wireless communication system. The wireless communication apparatus is configured to implement the above-mentioned embodiments and preferred implementation modes. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 5:
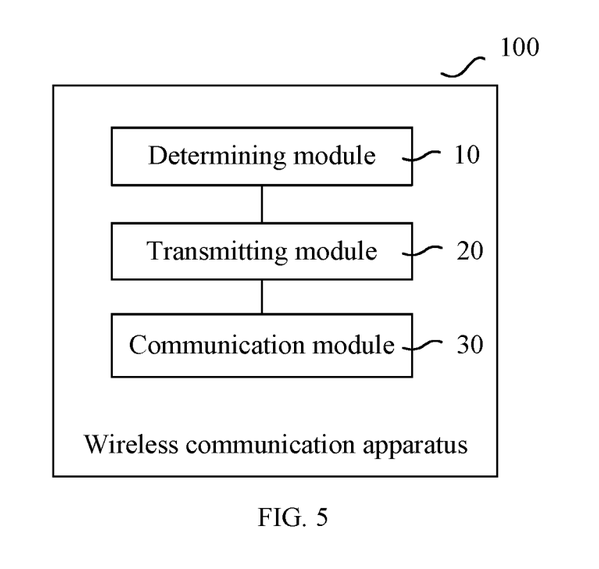
FIG. 5 is a block diagram of a wireless communication apparatus according to an embodiment of the present disclosure.

FIG. 5 is a block diagram of a wireless communication apparatus according to an embodiment of the present disclosure. As shown in FIG. 5, a wireless communication apparatus 100 is disposed in a wireless communication system and includes a determining module 10, a transmitting module 20 and a communication module 30.

The determining module 10 is configured to determine an overlapping wireless frequency band resource between the wireless communication system and a wireless-fidelity (WIFI) system. The transmitting module 20 is configured to transmit an interference signal on the overlapping wireless frequency band resource to enable a terminal of the WIFI system to adaptively switch to other wireless frequency band resources of the WIFI system for WIFI communications. The communication module 30 is configured to communicate with a terminal on the overlapping wireless frequency band resource.

In the above-mentioned embodiments, the apparatus may further include an interference signal calculation module. The interference signal calculation module is configured to calculate a position of the interference signal, a number of interference signals, a bandwidth of the interference signal and transmit power of the interference signal using the above-mentioned method. The transmitting module is configured to generate the interference signal and transmit an agreed number of interference signals with agreed transmit power, bandwidth and the like at the corresponding frequency domain position according to an output result of the interference signal calculation module.

In the above-mentioned embodiments, the apparatus may further include a synchronization module. In an optimized scheme, the synchronization module is configured to maintain time synchronization with a coexistent time division duplex (TDD) wireless communication system to enable the interference signal to be only transmitted within data receiving slots of a transmitting end and a receiving end of the TDD wireless communication system.

It is to be noted that the various modules described above may be implemented by software or hardware. Implementation by hardware may, but may not necessarily, be performed in the following manner: the various modules described above are located in a same processor or their respective processors.

In some embodiments, the determining module is further configured to determine, according to a size and a position of an occupied frequency-domain bandwidth of a cellular communication system, an overlapping sub-channel set between the cellular communication system and the WIFI system.

In some embodiments, a selection module is configured to select a position for transmitting the interference signal and a number of interference signals on the sub-channel set of the cellular communication system. The position for transmitting the interference signal and the number of the interference signal satisfy a condition that the interference signal interferes with each sub-channel in the sub-channel set of the WIFI system.

In some embodiments, the position for transmitting the interference signal is located on a guard band of the cellular communication system or on a transmission bandwidth of the cellular communication system.

In some embodiments, the transmit power on a unit frequency domain bandwidth of the interference signal satisfies a condition that an average received power value of each sub-channel in the sub-channel set received by all WIFI terminals in an interference area is not less than the preset threshold.

The transmit power of the interference signal, the bandwidth of the interference signal and the number of the interference signals satisfy the following formula:

$$\sum_{i=1}^{N} P_i * W_i - PL_{MAX} - 10 * \log_{10}(B) \geq X;$$

N denotes the number of interference signals, $P_i$ denotes transmit power on a unit frequency domain bandwidth of an i-th interference signal, $W_i$ denotes a frequency domain bandwidth of the i-th interference signal, $PL_{MAX}$ denotes a maximum path loss of an interfered sub-channel within a coverage range of the WIFI system, B denotes a frequency domain bandwidth of a sub-channel of the WIFI system, and X denotes a preset threshold for average received power of the interfered sub-channel.

When the cellular communication system is a frequency division duplex (FDD) system, the transmitting module transmits the interfering signal in an entire time domain of the FDD system. When the cellular communication system is a TDD system, the transmitting module only transmits the interfering signal within respective receiving slots of a transmitting end and a receiving end of the TDD system.

In some embodiments, the apparatus further includes a configuration module. The configuration module is configured to: when the position for transmitting the interference signal is located on the transmission bandwidth of the cellular communication system, configure a frequency domain position corresponding to the position for transmitting the interference signal within a bandwidth of the cellular communication system as a non-use region.

An embodiment of the present disclosure further provides a processor. The processor is configured to execute a program. The program, when executed, performs steps of the method in the embodiments described above. In this embodiment, the processor may be a single-chip microcomputer, an application specific chip or the like.

Figure 6:
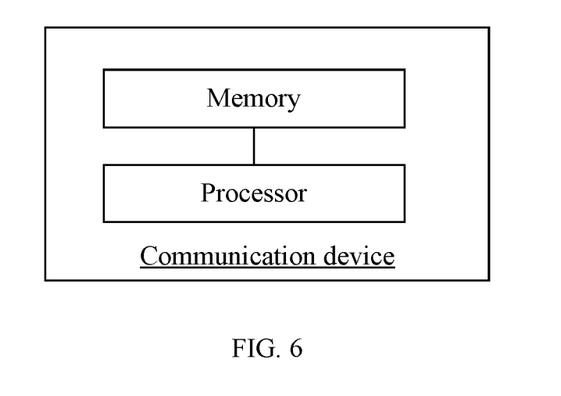
FIG. 6 is a structural diagram of a communication device according to an embodiment of the present disclosure.

As shown in FIG. 6, an embodiment of the present disclosure further provides a communication device. The communication device includes a memory and a processor. The processor is connected to the memory and configured to execute a program stored on the memory. The program, when executed, performs the wireless communication method provided in one or more technical solutions described above, for example, the method shown in FIG. 1.

The communication device may be an access network element of a cellular communication system, such as a base station and/or a relay node.

In some embodiments, the communication device may further include an antenna. The antenna may be configured to transmit and receive wireless signals, for example, the antenna is connected to the processor and may be at least configured to transmit the interference signal.

An embodiment of the present disclosure further provides a storage medium. In this embodiment, the storage medium may be configured to store program codes for executing steps of the method in the embodiments described above.

In this embodiment, the storage medium may include, but is not limited to, a USB flash disk, a read-only memory (ROM), a random access memory (RAM), a mobile hard disk, a magnetic disk, an optical disk or another medium capable of storing the program codes.

The method and the apparatus provided in the above-mentioned embodiments of the present disclosure may suppress transmissions and receptions of the WIFI system within a frequency domain bandwidth of the WIFI system, and enable a wireless communication system to coexist with the WIFI system within the frequency band.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only part of embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:

1. A wireless communication method, comprising:
determining an overlapping wireless frequency band resource between a cellular communication system and a wireless-fidelity (WIFI) system;
transmitting, by the cellular communication system, an interference signal on the overlapping wireless frequency band resource to shield a terminal of the WIFI system from performing communications on the overlapping wireless frequency band resource; and
communicating, by the cellular communication system, with a terminal on the overlapping wireless frequency band resource;
wherein a frequency domain bandwidth of the interference signal is determined according to a number of the interference signal and transmit power of the interference signal.

2. The method of claim 1, wherein determining the overlapping wireless frequency band resource between the cellular communication system and the WIFI system comprises:
determining, according to a size and a position of an occupied frequency-domain bandwidth of the cellular communication system, an overlapping sub-channel set between the cellular communication system and the WIFI system.

3. The method of claim 2, wherein before transmitting, by the cellular communication system, the interference signal on the overlapping wireless frequency band resource, the method further comprises:
determining a position for transmitting the interference signal from the sub-channel set of the cellular communication system and a number of the interference signal, wherein the position for transmitting the interference signal and the number of the interference signal satisfy a condition that the interference signal interferes with each sub-channel in the sub-channel set of the WIFI system.

4. The method of claim 3, wherein the position for transmitting the interference signal is located on a guard band of the cellular communication system or on a transmission bandwidth of the cellular communication system.

5. The method of claim 4, wherein transmit power of the interference signal satisfies a condition that an average received power value of each sub-channel in the sub-channel set received by all WIFI terminals in an interference area is not less than a preset threshold.

6. The method of claim 4, wherein when the position for transmitting the interference signal is located on the transmission bandwidth of the cellular communication system,
a frequency domain position corresponding to the position for transmitting the interference signal within a bandwidth of the cellular communication system is configured as a non-use region.

7. The method of claim 1, wherein transmit power of the interference signal, a bandwidth of the interference signal and a number of the interference signal satisfy the following formula:

$$\sum_{i=1}^{N} P_i * W_i - PL_{MAX} - 10 * \log_{10}(B) \geq X;$$

wherein N denotes the number of the interference signal, $P_i$ denotes transmit power on a unit frequency domain bandwidth of an i-th interference signal, $W_i$ denotes a frequency domain bandwidth of the i-th interference signal, $PL_{MAX}$ denotes a maximum path loss of an interfered sub-channel within a coverage range of the WIFI system, B denotes a frequency domain bandwidth of a sub-channel of the WIFI system, and X denotes a preset threshold for average received power of the interfered sub-channel.

8. The method of claim 1, wherein when the cellular communication system is a frequency division duplex (FDD) system, the interference signal is transmitted in an entire time domain of the FDD system; when the cellular communication system is a time division duplex (TDD) system, the interference signal is only transmitted within a receiving slot of a transmitting end and a receiving slot of a receiving end of the TDD system.

9. The method of claim 1, wherein the terminal of the WIFI system adaptively performs the communications on a wireless frequency band resource other than the overlapping wireless frequency band resource.

10. A storage medium, comprising a stored program, wherein the program, when executed, performs the method of claim 1.

11. A communication device, disposed in a cellular communication system, comprising: a memory and a processor,
wherein the processor is connected to the memory and configured to execute a program stored on the memory, wherein the program, when executed, performs a wireless communication method, wherein the wireless communication method comprises:
determining an overlapping wireless frequency band resource between the cellular communication system and a wireless-fidelity (WIFI) system;
transmitting an interference signal on the overlapping wireless frequency band resource to shield a terminal of the WIFI system from performing communications on the overlapping wireless frequency band resource; and
communicating with a terminal on the overlapping wireless frequency band resource;
wherein a frequency domain bandwidth of the interference signal is determined according to a number of the interference signal and transmit power of the interference signal.

12. The communication device according to claim 11, wherein determining the overlapping wireless frequency band resource between the cellular communication system and the WIFI system comprises:
determining, according to a size and a position of an occupied frequency-domain bandwidth of the cellular communication system, an overlapping sub-channel set between the cellular communication system and the WIFI system.

13. The communication device according to claim 12, wherein before transmitting the interference signal on the overlapping wireless frequency band resource, the wireless communication method further comprises:
determining a position for transmitting the interference signal from the sub-channel set of the cellular communication system and a number of the interference signal, wherein the position for transmitting the interference signal and the number of the interference signal satisfy a condition that the interference signal interferes with each sub-channel in the sub-channel set of the WIFI system.

14. The communication device according to claim 13, wherein the position for transmitting the interference signal is located on a guard band of the cellular communication system or on a transmission bandwidth of the cellular communication system.

15. The communication device according to claim 14, wherein transmit power of the interference signal satisfies a condition that an average received power value of each sub-channel in the sub-channel set received by all WIFI terminals in an interference area is not less than a preset threshold.

16. The communication device according to claim 14, wherein when the position for transmitting the interference signal is located on the transmission bandwidth of the cellular communication system, a frequency domain position corresponding to the position for transmitting the interference signal within a bandwidth of the cellular communication system is configured as a non-use region.

17. The communication device according to claim 11, wherein transmit power of the interference signal, a bandwidth of the interference signal and a number of the interference signal satisfy the following formula:

$$\sum_{i=1}^{N} P_i * W_i - PL_{MAX} - 10 * \log_{10}(B) \geq X;$$

wherein N denotes the number of the interference signal, $P_i$ denotes transmit power on a unit frequency domain bandwidth of an i-th interference signal, $W_i$ denotes a frequency domain bandwidth of the i-th interference signal, $PL_{MAX}$ denotes a maximum path loss of an interfered sub-channel within a coverage range of the WIFI system, B denotes a frequency domain bandwidth of a sub-channel of the WIFI system, and X denotes a preset threshold for average received power of the interfered sub-channel.

18. The communication device according to claim 11, wherein when the cellular communication system is a frequency division duplex (FDD) system, the interference signal is transmitted in an entire time domain of the FDD system; when the cellular communication system is a time division duplex (TDD) system, the interference signal is only transmitted within a receiving slot of a transmitting end and a receiving slot of a receiving end of the TDD system.

* * * * *